Figure 1:
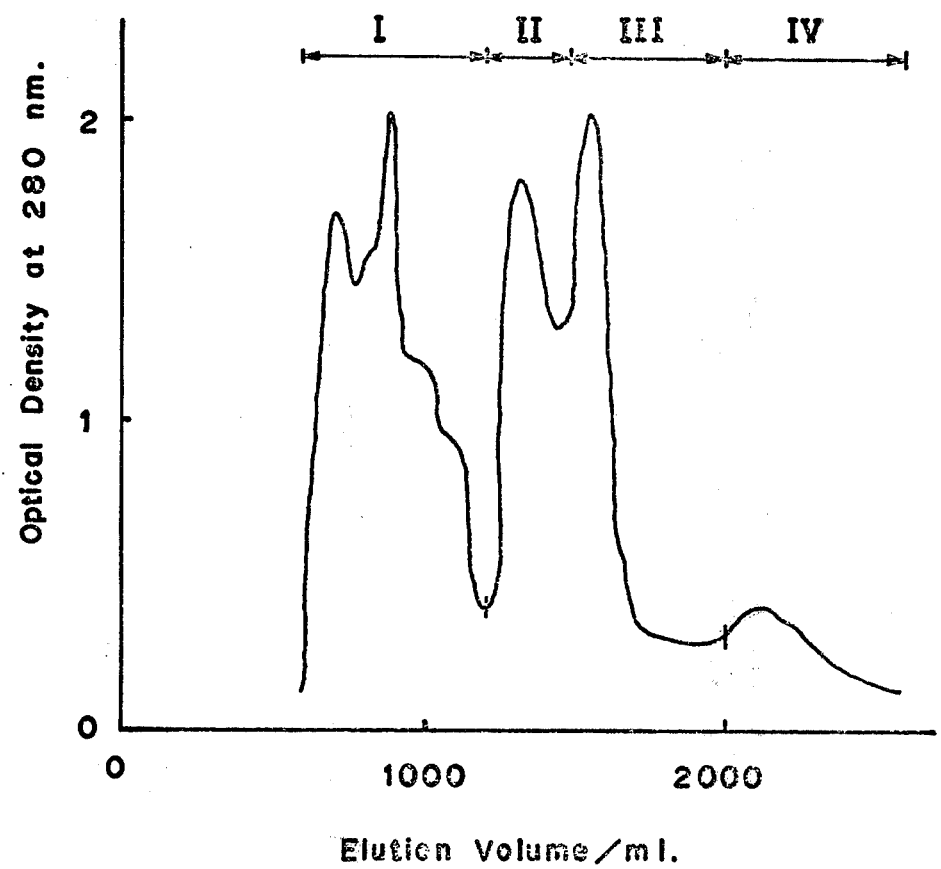

United States Patent [19]

Fujimaki et al.

[11] 4,016,147

[45] Apr. 5, 1977

[54] METHOD FOR PREPARATION OF LOW-PHENYLALANINE PLASTEIN

[75] Inventors: Masao Fujimaki, Tokyo; Soichi Arai, Yokohama; Michiko Watanabe, Matsudo, all of Japan

[73] Assignee: Fuji Oil Company, Ltd., Osaka, Japan

[22] Filed: Jan. 16, 1976

[21] Appl. No.: 649,794

[30] Foreign Application Priority Data

Jan. 16, 1975 Japan .............................. 50-7471

[52] U.S. Cl. ........................ 260/112 R; 260/121; 195/29
[51] Int. Cl.$^2$ .................. C07G 7/00; C12D 13/06
[58] Field of Search .................. 195/29; 426/212; 260/112 R

[56] References Cited

UNITED STATES PATENTS 3,803,327  4/1974  Fujimaki et al. .................... 195/29

OTHER PUBLICATIONS

Yamashita et al., Agricultural and Biological Chemistry, vol. 38, No. 6, pp. 1269–1271, (1974).

*Primary Examiner*—Lionel M. Shapiro
*Attorney, Agent, or Firm*—Wenderoth, Lind & Ponack

[57] ABSTRACT

Method for the preparation of a low-phenylalanine plastein comprising hydrolyzing stepwise a certain albumin or globulin protein with an endopeptidase having an affinity for the aromatic acid components, and an exopeptidase, subjecting the hydrolyzate thus-obtained to gel-filtration to divide it into two fractions, one being constituted with aromatic amino acids and the other being constituted with oligopeptides almost free from the aromatic amino acids, and then subjecting the latter fraction to usual plastein synthesis. Tyrosine and/or tryptophan may be added to the substrate at the plastein synthesis in order to incorporate them into the plastein molecules. The resultant plasteins may be purified through ultra-filtration in order to remove the remaining free amino acids and low-molecular peptides.

16 Claims, 4 Drawing Figures

METHOD FOR PREPARATION OF LOW-PHENYLALANINE PLASTEIN

This invention relates to a method for the preparation of new low-phenylalanine plasteins, certain synthetic protein-like substances, in which the phenylalanine components are scarce or are not contained at all.

Phenylketonuria is one of the genetic, abnormal metabolic diseases disclosed by Folling in 1934 and it is a miserable one which causes an idiocy. Newly born babies suffering from this disease are congenitally lacking an enzyme, phenylalaninehydroxydase, which converts phenylalanine to tyrosine. Therefore, the disease is characterized by enormous accumulation of phenylalanine in the blood and excretion of the abnormal metabolic products, such as phenylpyruvic acid and its derivatives, phenyllactic acid, phenylacetic acid and phenylacetylglutamine or the like. It is not clear what the cause of the intense nervous lesion is which is main clinical syndrome of this disease (it has been said that said phenylalanine per se is not at all responsible for the human nervous system. However, it is quite true that 80 to 90% of the children suffering from this disease inevitably become imbiciles or the like with an I.Q. index below 50. This fact is not only an unbearable affliction and agony for parents but is also a socially serious problem and consequently has brought about a strong need for preservation and medical treatment against this disease. As there has been developed no means for direct administration of the difficient enzyme into the patient's body, existing reliable therapeutic or preservative means against this disease is merely a diet therapy, in which certain low-phenylalanine diet is given to sucklings of 3 months of age, and this therapy is believed to be effective in hindering the generation of this phenylketonuria. However, since the phenylalanine is one of the most common amino acids and widely distributed in all protein sources at a rate of 4 – 6% on the basis of the weight of crude protein, it is impossible to select special natural foodstuffs having a far lower content of it. Thus, this diet is usually prepared by chemically hydrolyzing thoroughly natural protein sources to the free amino acids, treating the hydrolyzate thus formed with an absorbent such as active carbon to remove all aromatic amino acids including phenylalanine, and then, adding thereto the essential amino acids which are lacking such as tyrosine and tryptophan as a supplementally so as to form a balanced amino acid mixture containing a low concentration of phenylalanine. But, any low-phenylalanine diet now being sold has an unpleasant and unpalatable odor or taste. Therefore, except for the suckling, the patient is gradually prone to refuse to eat the diet as he grows older. Moreover, it is very difficult to afford some texture-like proteins to this diet because of their evident low molecular weight. Since the dietic therapy by this low-phenylalanine diet should be continued until the patient reaches his school age or more older, it is ideal that the diet be either a natural protein or the like which is nutritionally well balanced, as advocated recently by Altschul (A. M. Altschul; Nature, Vol. 248, page 643 (1974)).

The main object of this invention is to economically furnish a novel synthetic protein-like substance, like natural protein in its physical and nutritional properties and which contains no or very little phenylalanine is useful in the diet against phenylketonuria.

As a result of our continuous investigations, we have now found that albumin or globulin proteins such as meat, soybean, egg and microorganism proteins are decomposed down to oligopeptides by the enzymatic degradation with an endopeptidase having an affinity for the peptide bonds near the aromatic amino acid residues, such as pepsin or chymotrypsin; and this hydrolyzate is further hydrolyzed to the aromatic amino acid-free peptides by the second hydrolysis with the exopeptidase. The second hydrolyzate thus obtained can be purified through gel-filtration and then polymerized to give a novel, aromatic amino acid-free, protein-like substance (so-called "plastein") in good yield according to a usual plastein synthesis. We have further succeeded in obtaining novel, phenylalanine-free, tyrosine and/or tryptophanenriched plastein wherein the deficient, aromatic, essential amino acids excepting phenylalanine are incorporated into the peptide linkages in the above plastein, by adding tyrosin and/or tryptophan in the activated form to the substrate in the above plastein synthesis. Since these plasteins are far different from a mere mixture of the amino acids and are novel protein-like amino acid polymers having a mean molecular weight of about 2,000, and the constituent amino acids are linked with each other in the state of peptide bonding, they have physicochemical and nutritional properties similar to those of natural proteins, which makes the product valuable as an adequate diet for the treatment of phenylketonuria.

The method of this invention cand be summarized as follows:

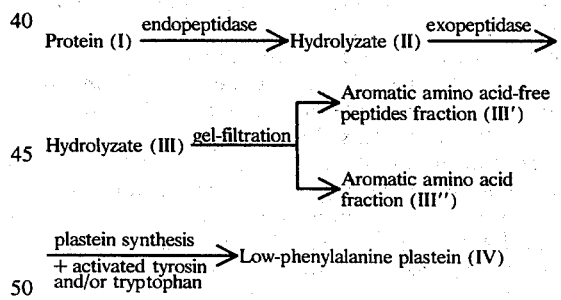

In the present invention, natural proteins are used as the starting material. As the proteins (I), water-soluble or saline-soluble proteins (e.g. albumins or globlins) are preferably employed. Prolamins (e.g. gliadin) are not preferable because of their difficult plastein formation. Suitable examples of the proteins are animal meat proteins, fish meat proteins, egg proteins, seed proteins such as soybean globulin, microorganism proteins (SCP) and the like. At first, the peptide linkages of these proteins are split off with an endopeptidase having affinity for aromatic amino acids, at its peptide bonds near the aromatic amino acid residues. This diversion will occur at the C-N bonds of either at the side of the amino groups and/or at that of the carboxyl groups in the peptides linkages of the protein (I) as follows:

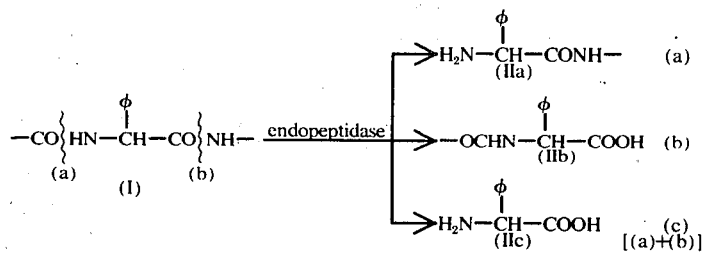

wherein "φ" indicates the same or different aromatic amino acid residue.

As shown above, in the event of either split (a) or (b), there are formed two peptides, IIa and IIb, having the aromatic amino acid terminals. But, if the splits (a) and (b) have simultaneously occurred as shown by (c), a free amino acid (IIc) is formed. The reaction (an enzymatic hydrolysis) is carried out by dissolving or suspending a raw protein material (I) into water with a suitable enzyme having the endopeptidase activity. The enzyme is not required to be pure but may be crude. Pepsin is the most suitable enzyme, but chymotrypsin may also be used. Moreover, it is advantageous to lower the active range of the pepsin as low as below pH 2 in order to prevent the unfavorable putrefaction of the substrate during the incubation. Generally speaking, another endopeptidase originated from microorganisms is non-specific to the aromatic amino acid moieties and therefore is hardly suitable for use in the present invention. The amount of the enzyme should be determined empirically on the basis of the activity thereof. If the case of pepsin ("Difco Pepsin", the activity indicated: 1 : 10,000 to control 555015), the appropriate concentration thereof in the substrate may be around 0.06 to 0.2% by weight. When the concentration of the enzyme is more than over 0.2% by weight, the desired speciality to the aromatic amino acid moieties will be last.

The hydrolyzate (II) is a mixture composed mainly of the peptides (IIa) and (IIb) having the aromatic amino acid residues at the terminal positions and less free amino acids (IIc). This hydrolyzate is, then, redegraded with an exopeptidase being capable of attacking the terminal peptide bonds of the peptides and thereby the terminal aromatic amino acid components are released from the latter. This second hydrolysis may be resumed by the following scheme:

wherein R is the same or different and represents other amino acid residues.

The exopeptidase is classified into two genera: carboxypeptidase and aminopeptidase according to their attacking position, i.e. either the terminal carbon atoms or the terminal nitrogen atoms in the peptide linkages. However, in the present invention, the mixture of both of the above genera is preferable in view of the fact that the hydrolyzate (II) will probably contain both of the peptides (IIa) and (IIb) in the same amount, respectively. There are known carboxypeptidase A as the pure carboxypeptidase and leucineaminopeptidase as the pure aminopeptidase, respectively. However, these pure enzyme preparations are too expensive and are not suitable for practical use, and therefore, the use of a crude enzyme containing both enzymes is more practical. "Pronase" (trade name of the enzyme preparation supplied from Kaken Chemical Co., Ltd., Tokyo, Japan) is a commercially available enzyme preparation favorably used in the present invention. This enzyme preparation can break the former peptides (IIa) and (IIb) down to smaller peptides having a mean molecular weight of about 800 which can be favorably used for the subsequent plastein synthesis. The active pH of this Pronase widely ranges from acidic to alkaline, but in the present invention, the hydrolysis with the enzyme is preferably carried out at the pH range in which the exopeptidase can mainly show its activity and which hinders as much as possible any unfavorable side-action by the accompanying other proteases. The following Table 1 shows the rate of the free amino acid formation* and the degree of hydrolysis ** when the pepsin hydrolyzate of a fish protein (II) was treated with Pronase at various pH values.

\* Percentages by weight of the free amino acid contents to the total amount of the free and combined amino acids.
\*\* Percentages by weight of 10% trichloracetic acidsoluble nitrogen to the total nitrogen.

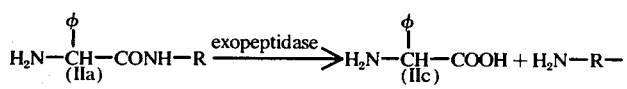

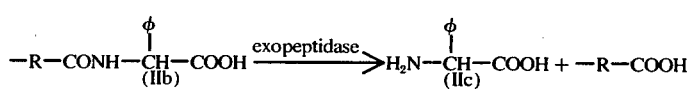

Table 1

| Amino acids | pH | | | | | | | |
|---|---|---|---|---|---|---|---|---|
|  | 6 | 6.5 | 7 | 8 | 9 | 10 | 11 | 12 |
| Lysine (Lys) | 4.3 % | 5.5 % | 7.1 % | 10.9 % | 14.6 % | 20.9 % | 12.5 % | 0.0 % |
| Histidine (His) | 10.2 | 10.1 | 11.6 | 28.6 | 30.3 | 35.5 | 32.0 | 0.0 |
| Arginine (Arg) | 8.9 | 9.3 | 11.0 | 14.8 | 17.9 | 17.8 | 11.9 | 0.0 |
| Aspartic acid (Asp) | 0.9 | 2.3 | 3.5 | 0.5 | 1.3 | 1.2 | 0.0 | 0.0 |
| Threonine (Thr) + | | | | | | | | |

Table 1-continued

| Amino acids | pH 6 | 6.5 | 7 | 8 | 9 | 10 | 11 | 12 |
|---|---|---|---|---|---|---|---|---|
| Glutamine (Glu) | 4.6 | 5.1 | 6.0 | 13.5 | 5.1 | 8.3 | 0.0 | 0.0 |
| Serine (Ser) + Asparagine (Asg) | 8.1 | 8.9 | 10.5 | 6.8 | 4.6 | 13.5 | 1.1 | 0.0 |
| Glutamic acid (Glu) | 1.2 | 1.0 | 0.8 | 1.0 | 1.5 | 1.6 | 0.0 | 0.0 |
| Proline (Pro) | 0.0 | 0.0 | 0.0 | 0.0 | 0.0 | 0.0 | 0.0 | 0.0 |
| Glycine (Gly) | 0.0 | 0.5 | 1.1 | 11.9 | 13.6 | 7.6 | 7.5 | 0.0 |
| Alanine (Ala) | 2.6 | 3.3 | 3.8 | 8.3 | 8.5 | 7.5 | 5.3 | 0.0 |
| Cystine (Cys) | 0.0 | 0.0 | 0.0 | 4.3 | 4.3 | 1.1 | 0.0 | 0.0 |
| Valine (Val) | 16.6 | 19.7 | 23.2 | 27.7 | 5.4 | 3.4 | 2.7 | 0.0 |
| Methionine (Met) | 20.8 | 20.2 | 21.6 | 37.5 | 30.9 | 24.5 | 15.4 | 0.0 |
| Isoleucine (Ile) | 18.9 | 20.5 | 28.1 | 31.6 | 30.3 | 23.7 | 10.3 | 0.0 |
| Leucine (Leu) | 52.1 | 52.0 | 52.5 | 51.3 | 42.7 | 34.4 | 21.8 | 0.0 |
| Tyrosine (Tyr) | 48.4 | 50.1 | 52.8 | 52.8 | 44.1 | 37.8 | 24.6 | 0.0 |
| Phenylalanine (Phe) | 63.1 | 63.6 | 64.0 | 62.0 | 55.0 | 47.0 | 34.0 | 0.0 |
| Tryptophan (Trp) | 50.5 | 51.8 | 53.5 | 48.5 | 41.4 | 37.4 | 27.3 | 0.0 |
| Degree of Hydrolysis | 97.9 | 97.9 | 98.1 | 99.5 | 99.3 | 97.1 | 95.1 | 65.7 |

The material obtained by the treatment with the exopeptidase is then subjected to a gel-filtration in order to obtain a purer fraction, wherein the aromatic amino acid components consisting of the free amino acids and peptides having these amino acid residues are removed. For this gel-filtration, a bridged dextran (a trade name "Sephadex") or polyacrylamide gel may be used as the filtrating agent. But, in a practical sense, the former is more preferable than the latter because of its lower price and non-toxicity. Besides, the gel-filtrating agent is preferably the one having the proper pore size so that it can pass through the comparatively small peptide molecules having a molecular weight of less than about 1,000. Another effect of this gel-filtration is the absorption of the aromatic amino acids. By proper selection of the eluating solvent, the elution of the aromatic amino acids will be delayed so as to give a fraction in which said amino acids are scarcely contained. The solvent for the elution should be experimentally selected from the hydrophilic ones but, in view of the toxicity, acetic acid or ethanol is the most practical one. Other hydrophilic solvents, such as methanol, isopropanol, propionic acid, acetone or methyl ethyl ketone may also be employed, but they are generally not preferable for edible products owing to their toxicity and/or unpleasant odor. Alternatively, even water itself may be used as the solvent, but it does not give the desired clean-cut fraction. The following Table 2 shows some illustration of the many results obtained by using acetic acid and ethanol as the solvents, and Sephadex G-15 as the filtrating agent.

Table 2

| Materials | Solvents Kinds | Concentration | Results |
|---|---|---|---|
| Fish meat protein | Acetic acid | 0.25 M | slightly bad |
| " | " | 0.5 M | good |
| " | " | 0.7 M | not observed |
| soy protein | Ethanol | 5 V/V % | good |
| " | " | 10 V/V % | " |
| " | " | 15 V/V % | A few precipitation occurred. |

Generally, acetic acid is more effective than ethanol in delaying the elution of the aromatic amino acid components, but it has one drawback in that it causes clouding at early eluate when it has been applied to certain less hydrophilic peptides such as one from soy protein, and therefore it may be more suitable for the treatment of fish meat protein hydrolyzate.

On the other hand, ethanol has some further advantages, in that, it can be readily recovered from the eluate and is effective in preventing putrefaction of the hydrolyzate (III) during the gel-filtration.

The hydrolyzate (III') thus obtained in which the aromatic amino acid components are absent or scarce, is then subjected to a plastein synthesis in accordance with usual manners. (See: J. Agr. Food Chem., Vol. 19, No. 6, pages 1151 –1154 (1971); British Pat. No. 1,317,035; Kagaku-to-Seibutsu, Vol. 8, No. 11, pages 658 – 667 (1970); Japanese Patent Publication No. 6660/1974, etc.). Any protease may be employed for this synthesis, however, because the hydrolyzate (III') lacks tyrosine as well as tryptophan, which is derived from the phenylalanine by way of certain metabolic paths, it is nutritionally preferable to incorporate both amino acids into said plastein molecules. For instance, both activated amino acids are added into the hydrolyzate (III') and subjected to the plastein synthesis by the aid of an SH-enzyme in a manner similar to the usual method. The SH-enzyme used is, for example, papain which is active to hydrophobic amino acids. Leucine and/or methionine can also be incorporated into the resultant plastein molecules in a similar way. On the contrary, it is difficult to incorporate acidic or basic amino acids which are less active to the hydrophobic affinity center of the papain. Likewise, the incorporation of isoleucine and/or valine is less successful because of their steric hindrance.

The activation of the amino acids to be incorporated can be attained by altering these acids to their esters, amides or N-acyl (e.g., N-acetyl) derivatives. If such a modification has not been done, the aimed incorporation will be unsatisfactory because of these acids insufficient activities owing to the lack of free energy.

The low-phenylalanine plastein will still contain a small amount of impurities, such as free amino acids and low molecular peptides, which is liable to result in taste deterioration of the product. Therefore, it is preferable to remove them in order to obtain a satisfactory product. This refining can, for the most part, be accomplished by removing the low molecular portion having a molecular weight below about 500. Any ultra-filter such a membrane filter may successfully be applied to this refining. This ultra-filtration is further beneficial in order to obtain an aseptic preparation without involving a speical sterilization process because this procedure is also effective for exclusion of contaminated microorganisms. However, as is clearly understandable from the foregoing explanation, this procedure is, at any rate, not concerned with the substance of this invention.

The plastein solution thus obtained is, if desired after purification through ultrafiltration, dried to give the final product in powder form as in common proteinaceous products. The drying is carried out by a conventional method, such as vacuum freeze-drying, spray drying and/or film drying (for example, by a drum dryer). The final product is a white, tasteless, amorphous powder, readily soluble in water and has a balanced amino acid composition. The product may be further processed, if desired, into any form suitable for foods or foodstuffs, such as granules, chops, shreds, loaves, minces, blocks and the like with or without appropriate seasonings, flavors, pigments, extenders, plasticizers, binders, stabilizers and/or other edible adjuvants by common food processing. The following Table 3 shows the amino acid compositions of the products prepared from either a fish meat protein or a soy protein.

Table 3

| Amino acids | Fish meat protein | Soy protein |
|---|---|---|
| Arg | 4.22 % | 4.21 % |
| His | 1.76 | 1.41 |
| Ile | 2.81 | 3.83 |
| Leu | 3.69 | 2.93 |
| Lys | 10.11 | 3.83 |
| Thr | 4.20 | 4.39 |
| Trp | 2.98 | 2.80 |
| Val | 3.81 | 3.24 |
| S-containing amino acids (total) | 3.31 | 2.76 |
| ⎡ Met | 1.90 | 0.94 ⎤ |
| ⎣ ½Cys | 1.41 | 1.82 ⎦ |
| Aromatic amino acids (total) | 7.82 | 8.19 |
| ⎡ Phe | 0.00 | 0.23 ⎤ |
| ⎣ Tyr | 7.82 | 7.96 ⎦ |
| Ala | 4.82 | 2.56 |
| Asp | 13.67 | 18.00 |
| Glu | 27.17 | 33.56 |
| Gly | 3.94 | 3.89 |
| Pro | 4.25 | 2.11 |
| Ser | 3.58 | 4.67 |

The present invention is illustrated by the following examples but is not limited thereto.

EXAMPLE 1

To 10 g of a fish meat protein ("Protane", a trade name of the product furnished from Sopharma S. A., Co., Switzerland) (I) was added a proper amount of water so as to bring the total volume up to 1 liter and then adjusted to pH 1.5 with concentrated hydrochloric acid to form a homogeneous solution. To the solution 10 mg of pepsin (furnished from Difco Co., U.S.A.) was added and the mixture (substrate) was stirred at 37° C for 48 hours. The reaction mixture (the hydrolyzate (II)) showed 67.8% of the degree of the hydrolyzation according to a measurement with 10% trichloroacetic acid. The mixture was then readjusted to pH 6.5 and thereto was added 10 mg of Pronase and the mixture was further incubated for 5 hours. During this incubation, the pH of the mixture was kept at about 6.5 with concentrated sodium hydroxide solution. The hydrolyzate (III) thus obtained was then freeze-dried.

Figure 3:
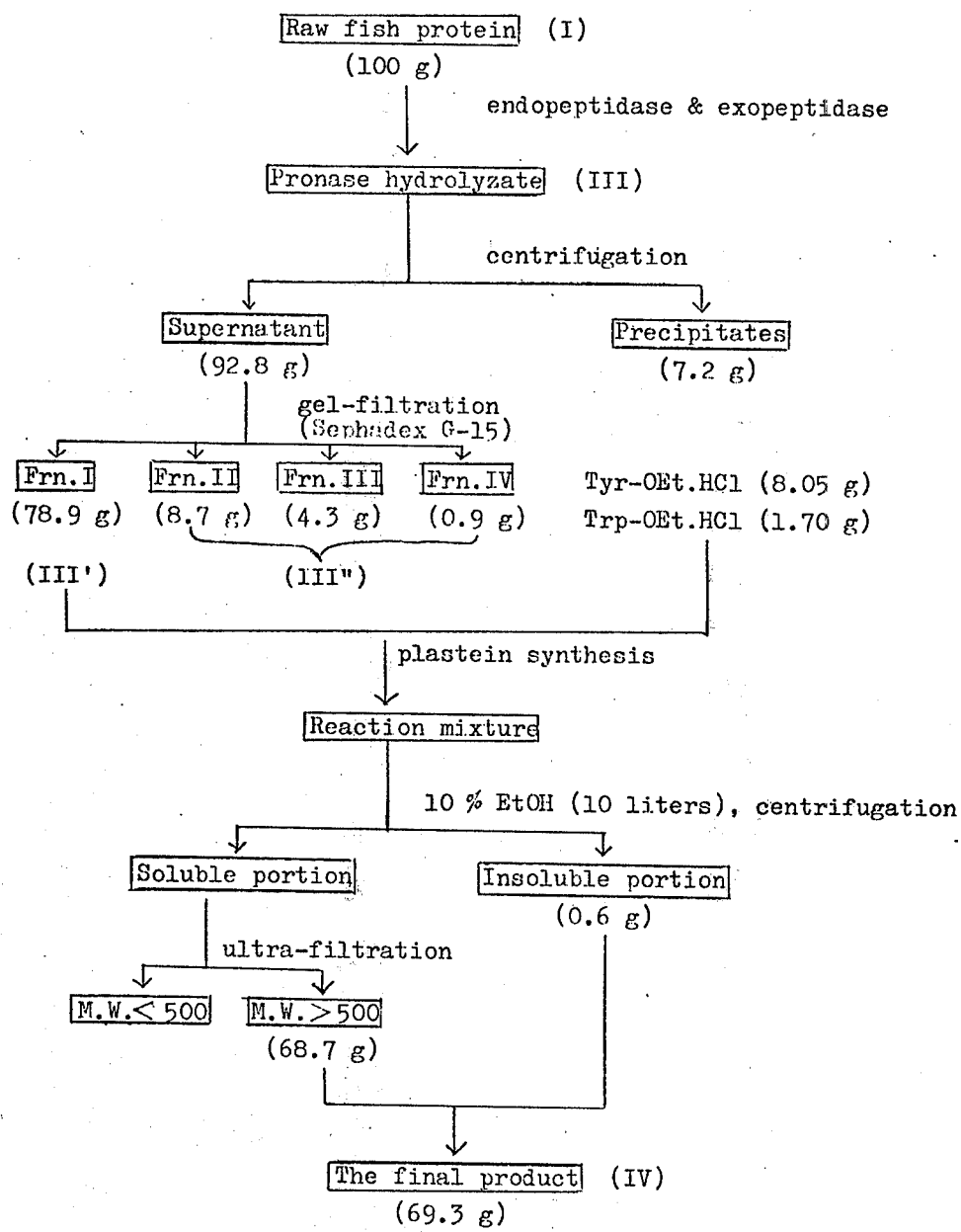

To 5 g of this freeze-dried powder of the hydrolyzate (III) was added 10 ml of 0.5 M acetic acid and centrifuged to exclude any insoluble materials. The supernatant including 4.64 g of the soluble solids was then passed into a column (5 cm I.D. ×75 cm length) filled with Sephadex G-15. Thereafter, the column was eluted with 0.5 M acetic acid at a velocity of 6 ml per minute at 25° C and divided into some fractions of each 20 ml with a fraction collector. Every fraction thus obtained was measured for its optical density at 280 nm with a spectrophotometer. The patterns of the gel-filtration are shown in the accompanying FIG. 1, and further the flow chart of the procedure of this example is shown in FIG. 3.

The results are shown by the following Table 4, wherein the amino acid composition of each fraction is indicated by percent by weight.

Table 4

| Amino acids | Fractions | | | |
| | I | II | III | IV |
|---|---|---|---|---|
| Arg | 8.18 % | 2.64 % | 0.90 % | 0.00 % |
| His | 2.98 | 0.64 | 0.46 | 0.00 |
| Ile | 5.69 | 7.57 | 1.83 | 0.00 |
| Leu | 3.39 | 18.49 | 0.47 | 0.00 |
| Lys | 13.48 | 2.42 | 0.44 | 0.00 |
| Thr | 4.94 | 3.78 | 2.18 | 0.00 |
| Trp | 0.00 | 0.00 | 0.00 | 98.25 |
| Val | 7.34 | 3.13 | 2.13 | 0.00 |
| S-containing amino acids (total) | 3.35 | — | — | — |
| ⎡ Met | 1.92 | — | — | — ⎤ |
| ⎣ ½Cys | 1.43 | — | — | — ⎦ |
| Aromatic amino acids (total) | 0.00 | 31.89 | 66.79 | 1.38 |
| ⎡ Phe | 0.00 | 28.25 | 8.21 | 0.00 ⎤ |
| ⎣ Tyr | 0.00 | 3.64 | 58.58 | 1.38 ⎦ |
| Ala | 6.51 | 2.28 | 3.31 | 0.00 |
| Asp | 12.06 | 4.07 | 5.50 | 0.00 |
| Glu | 20.89 | 5.92 | 9.46 | 0.00 |
| Gly | 4.36 | 2.14 | 3.02 | 0.00 |
| Pro | 2.37 | 1.57 | 1.04 | 0.00 |
| Ser | 3.80 | 2.57 | 1.79 | 0.00 |

As clearly understood by the foregoing Table 4, Fraction I includes neither tryptophan, phenylalanine nor tyrosine. These deficient amino acids are concentrated into the Fractions II to IV. In particular, it should be noted that tryptophan is concentrated into Fraction IV and that tyrosine occupies the major portion of Fraction III. Thus, these fractions III and IV can be utilized as a source of Tryptophan and/or tyrosine per se or for the next plastein synthesis after the reesterification thereof. The yield of each fraction is shown by the following Table 5, in which the yield of each fraction is calculated by the nitrogen recovery rate on the basis of the weight of the hydrolyzate (III).

Table 5

| | | |
|---|---|---|
| Hydrolyzate (III) | Soluble portion (total) | 92.8 % |
| | Fraction I | 78.9 % |
| | Fraction II | 8.7 % |
| | Fraction III | 4.3 % |
| | Fraction IV | 0.9 % |
| | Insoluble portion | 7.2 % |

These fractions were then freeze-dried as it were for the next procedures.

2 g of Fraction I, [the hydrolyzate (III')], 200 mg of tyrosine ethyl ester and 30 mg of tryptophan ethyl ester were dissolved in 2 ml of aqueous acetone. The solution was then adjusted to pH 6.5 with aqueous sodium hydroxide solution (but, this pH adjustment is not essential) and subjected to the plastein synthesis with the addition of 20 mg of papain (furnished from Difco Co.) at 37° C for 48 hours. The reaction mixture was then diluted with 100 ml of 10% aqueous ethanol, homogenized and agitated for 5 hours at a room temperature in order to split the ester linkages of the incorporated amino acid residues. Thereafter, the reaction mixture was readjusted to pH 7.0 and centrifuged (the amount of the precipitates was negligible). To this supernatant was added 100 ml of 10% aqueous ethanol and the mixture was then filtered through an Amicon Type 402 ultra-filter so as to obtain a fraction having a molecular weight or more than 500 and this fraction was distilled in vacuo to remove the solvent (ethanol) and freeze-dried to give the fine product (78.9% on the basis of the raw protein material). This product has such an amino acid composition as described in Table 2, and is completely tasteless and odorless over a logical panel test.

EXAMPLE 2

Figure 2:
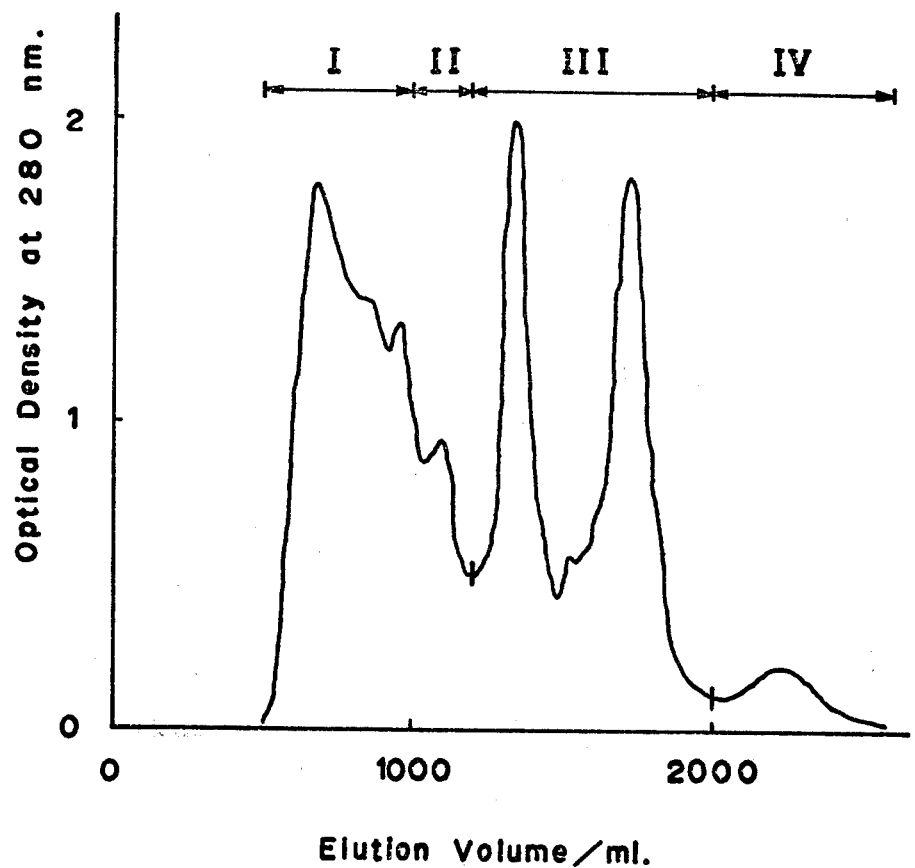
Figure 4:
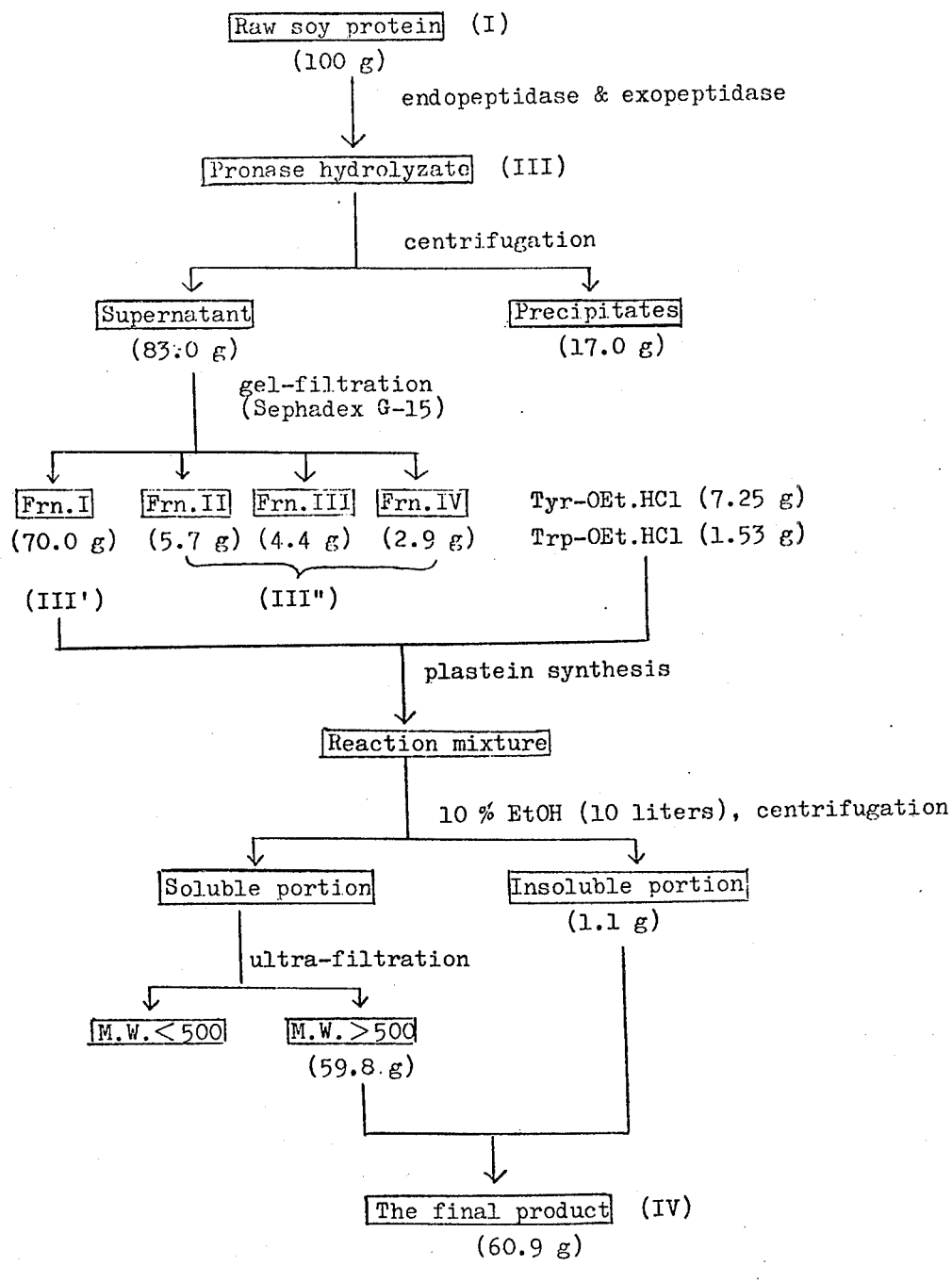

The above Example 1 was repeated except that a soy protein was used instead of the fish meat protein. To 10 g of acid-precipitated soy protein (supplied from Fuji Oil Co., Ltd., Osaka, Japan) was added 1 liter of water, and the mixture was well agitated with a mixer, adjusted to pH 12 with a concentrated aqueous sodium hydroxide solution and then centrifuged to obtain a supernatant. The supernatant was then readjusted to pH 4.5 and the precipitates thus formed were collected and subjected to enzymatic hydrolysis, gel-filtration, plastein synthesis and ultra-filtration in a similar manner as described in Example 1, except that the gel-filtration was carried out with 10% ethanol ad the eluting fluid. The patterns of the gel-filtration and the flow chart of the procedure of this example are shown in the accompanying FIG. 2 and FIG. 4, respectively.

The amino acid composition and yield of each fraction in this example are shown in the following Table 6.

Table 6

| Amino acids | Fractions | | | |
|---|---|---|---|---|
| | I | II | III | IV |
| Arg | 6.01 % | 15.13 % | 0.53 % | 0.01 % |
| His | 2.13 | 4.20 | 0.10 | 0.02 |
| Ile | 3.27 | 9.82 | 3.14 | 0.15 |
| Leu | 2.91 | 21.46 | 4.25 | 0.27 |
| Lys | 8.01 | 5.39 | 0.21 | 0.12 |
| Thr | 4.31 | 3.41 | 1.91 | 0.11 |

Table 6-continued

| Amino acids | Fractions | | | |
|---|---|---|---|---|
| | I | II | III | IV |
| Trp | 0.00 | 0.00 | 0.00 | 30.45 |
| Val | 4.54 | 9.56 | 2.53 | 0.27 |
| S-containing amino acids (total) | 2.79 | — | — | — |
| ⎡ Met | 0.94 | — | — | — ⎤ |
| ⎣ ½Cys | 1.85 | — | — | — ⎦ |
| Aromatic amino acids (total) | 0.69 | 2.93 | 79.66 | 65.04 |
| ⎡ Phe | 0.24 | 1.70 | 67.33 | 3.83 ⎤ |
| ⎣ Tyr | 0.45 | 1.23 | 12.33 | 61.21 ⎦ |
| Ala | 3.65 | 4.24 | 1.68 | 0.07 |
| Asp | 17.06 | 8.63 | 6.58 | 0.09 |
| Glu | 34.21 | 10.29 | 2.75 | 0.10 |
| Gly | 4.05 | 3.52 | 2.22 | 0.01 |
| Pro | 4.93 | 1.49 | 0.00 | 0.00 |
| Ser | 4.95 | 4.51 | 2.37 | 0.25 |
| Yields* | 70.0 | 5.7 | 4.4 | 2.9 |

[Note]: * Insoluble portion: 17.0 %

The product obtained by this Example 2 has the amino acid composition as shown in Table 3 and is a white powder without any odor or taste.

EXAMPLE 3

The raw materials, the Pronase hydrolyzate, the first gel-filtration fractions (gel-filtrate) and the final product (plastein) according to Example 1 and 2 were chemically estimated and organoleptically evaluated with a number of skilled panels. The results are shown in Table 7.

Table 7

| Materials | Water solubility | Molecular weight | | Taste | Odor | Mouthfeel |
|---|---|---|---|---|---|---|
| | | minimum | maximum | | | |
| Fish protein (the raw material) | very low | — | — | flat | fishy | course |
| Pronase hydrolyzate | very good | 75* | — | bitter | fishy | rustling |
| Gel-filtrate | very good | — | 4150 | weak | flat | — |
| Final product | good | 500 | 20020 | flat | flat | sticky |
| Soy protein (the raw material) | very low | — | — | flat | beany | course |
| Pronase hydrolyzate | very good | 75* | — | bitter | beany | rustling |
| Gel-filtrate | very good | — | 5220 | weak | flat | — |
| Final product | good | 500 | 20100 | flat | flat | sticky |

[Note]: *) Molecular weight of free glycine

What is claimed is:

1. A method for the preparation of low-phenylalanine plasteins comprising (a) hydrolyzing of a protein selected from the group consisting of an albumin and a globulin with an endopeptidase having affinity for the aromatic amino acid constituents of said protein and subsequently with an exopeptidase to give a hydrolyzate, (b) subjecting the resulting hydrolyzate to a gel-filtration to divide it into two fractions, the one containing the aromatic amino acid components and the other containing no or few aromatic amino acids, and (c) subjecting the latter fraction to a plastein synthesis.

2. The method according to claim 1, wherein the plastein synthesis is carried out in the co-existence of an activated tyrosine and/or tryptophan.

3. The method according to claim 1, wherein the raw reaction mixture obtained after the plastein synthesis is subjected to an ultra-filtration so as to filter the low-molecular peptides having a molecular weight of less than about 500 and free amino acids.

4. The method according to claim 1, wherein the plastein synthesis is carried out in the co-existence of an activated tyrosine and/or tryptophan and the raw reaction mixture obtained after the plastein synthesis is subjected to an ultra-filtration so as to filter the low-molecular peptides having a molecular weight of less than about 500 and free amino acids.

5. The method according to claim 1, wherein the protein is a member selected from the group consisting of an animal meat protein, a fish meat protein, an egg protein, an oil seed protein, a single cell protein and a mixture thereof 6. The method according to claim 1, wherein the endopeptidase is pepsin and the exopeptidase is Pronase.

7. The method according to claim 1, wherein the gel-filtration is carried out by passing the hydrolyzate through a column filled with a bridged dextran or polyacrylamide gel as filtrating agent and eluting with an aqueous acetic acid or ethanol.

8. The method according to claim 2, wherein the activated tyrosine and/or tryptophan are esters, amides or N-acyl derivatives thereof.

9. The method according to claim 8, wherein the esters are ethyl esters thereof.

10. The method according to claim 1, wherein the plastein synthesis is carried out with the aid of a SH-enzyme.

11. The method according to claim 10, wherein the SH-enzyme is Papain.

12. The method according to claim 3, wherein the ultra-filtration is carried out with a membrane filter.

13. The method according to claim 7, wherein the pore size of the gel-filtrating agent is selected so as to permit the passing through of the peptides having a mean molecular weight of about 1000.

14. The method according to claim 1, wherein the hydrolysis is controlled so as to obtain the peptides having a mean molecular weight of about 800.

15. The method according to claim 2, wherein the by-produced fractions separated through the gel-filtration are utilized for the next plastein synthesis as the source of the said amino acids.

16. A plastein having a mean molecular weight of about 2,000 prepared by a method as set forth in claim 1, said plastein being a protein-like amino acid polymer wherein the constituent amino acids are linked with each other in the state of peptide bonding and which plastein is substantially phenylalanine free such that it may be used as a dietary food for treating phenylketonuria.

* * * * *